United States Patent [19]
Preikschat

[11] 3,876,121
[45] Apr. 8, 1975

[54] LINEAR PINCH VALVE
[76] Inventor: Fritz K. Preikschat, 16020 Lake Hills Blvd., Bellevue, Wash. 98004
[22] Filed: Oct. 18, 1971
[21] Appl. No.: 190,170

Related U.S. Application Data
[62] Division of Ser. No. 54,286, July 13, 1970, Pat. No. 3,653,543.

[52] U.S. Cl. ............... 222/503; 222/504; 222/528; 251/7; 251/212
[51] Int. Cl. ........................................... B65d 47/00
[58] Field of Search .......... 222/503, 504, 528, 529, 222/181, 185, 212, 214; 251/1, 7, 8, 212, 294

[56] References Cited
UNITED STATES PATENTS

| | | | |
|---|---|---|---|
| 2,307,273 | 1/1943 | Hughes | 251/212 |
| 3,101,871 | 8/1963 | Lucas et al. | 222/214 |
| 3,329,396 | 7/1967 | Heaton et al. | 251/212 |

FOREIGN PATENTS OR APPLICATIONS

| | | | |
|---|---|---|---|
| 257,902 | 9/1927 | United Kingdom | 251/7 |

*Primary Examiner*—Allen N. Knowles
*Attorney, Agent, or Firm*—Christensen, O'Connor, Garrison & Havelka

[57] ABSTRACT
A system for providing proportional and continuous control of the level of a product within a bin includes a sensor which provides an output signal which is proportionally related to the actual level of the product within the bin, an analog controller which compares that output signal with a reference to derive therefrom an error signal, and further including means responsive to the error signal for providing a control signal which incorporates the work function associated with the bin, an actuator control circuit, an actuator, and a flow rate regulating device. The actuator control circuit responds to the control signal to appropriately modify the setting of the actuator and thus vary the flow rate established through the flow rate regulating device in a manner which returns the bin level to a desired value represented by the reference in the analog controller. The sensor may comprise a metallic rod and provide its output signal by determining the complex impedance existing between the rod and the bin wall, wherein the rod is partially immersed in the product. The flow rate regulating device may control the flow rate of discharge either into or from the bin. One such device comprises a linear pinch valve useful in regulating the flow rate of discharge from the bin which includes a conical transfer section and a three-point pinching mechanism. A general description of the analog controller and its relation to the bin's work function is given. Finally, a circuit for providing appropriate signals when the bin level reaches maximum or minimum values is disclosed.

5 Claims, 11 Drawing Figures

3,876,121

LINEAR PINCH VALVE

CROSS-REFERENCE TO RELATED APPLICATION

This application is a division of a copending application entitled "Proporational Bin Level and Flow Control System," Preikschat, Ser. No. 54,286, filed July 13, 1970 now U.S. Pat. No. 3,653,543.

BACKGROUND OF THE INVENTION

This invention generally relates to process control systems, and more particularly, to such systems which provide proportional control of the level of a product within a bin while maintaining a uniform flow rate of the product either to or from the bin.

Certain types of processes common in the food and water treatment industries, for example, have long time constants in which the product being treated or formed by the process moves slowly but continuously through the process steps, or in which the product is treated or formed in each step for a relatively long period of time.

Industrial processes of this type and others are described in more detail in a co-pending application entitled INDUSTRIAL PROCESS CONTROL DEVICE CONTROLLING OPERATIONS WITH LONG TIME CONSTANTS, by Fritz K. Preikschat, which is likewise assigned to the assignee of the present invention. In that application, an improved control system is described and claimed for providing proportional control by means of a process control parameter in response to a measurement of a process variable.

The teachings of that application are relevant to a consideration of the present invention and therefore the details thereof are fully incorporated by reference into this application. In addition, specific references will be made to that application as "the co-pending application" at points throughout the remainder of this specification.

The instant invention deals with adaptations of the system described in the co-pending application to industrial processes which involve the transfer of a product into and out of a storage bin or tank. Although the invention will be hereinafter described in terms of an industrial process for a flour mill in which the product comprises wheat, it also finds applicability in other processes of the food, water treatment, and other similar industries.

In the case of certain processes useful in producing flour, it is desirable to store wheat within a bin for a relatively long period of time, that is, on the order of 10 to 30 minutes, during which time the wheat either absorbs additives, such as water, or is simply held in order for a simultaneous process step to be completed on another product. In such cases it is desirable to uniformly transfer the wheat to or from the bin. In the interest of process economy, it is imperative that this transfer be done on a continuous basis so that the entire process can be operated continuously, that is, material is constantly flowing through the process steps so that a continuous flow of end products is obtained.

In the example discussed, it is desirable to keep the level of wheat in the bin within a predetermined range. It will be shown hereinafter that the level of the product can be kept within the predetermined range or at a predetermined value by controlling the flow rate of discharge to or from the bin.

However, if the bin is to be used in a continuous process as described above, the discharge of material must likewise be continuous. In addition, any change in the rate of discharge must be controlled within desired limits if a truly continuous process is to be achieved. For example, some of the prior art devices for bin control have sensed either an extreme high or an extreme low level of product and provided in response thereto one of two output signals which would be supplied to appropriate means controlling the discharge of material from the bin. With these devices, the bin level control is provided only upon an extreme limit of product, so that the discharge therefrom is in large, discontinuous amounts. With similar devices, bin level control is provided for intermediate levels of product so that the discharge of product from the bin is in discrete steps providing a "step-wise" proportional bin level control. In both of these situations, changes in the rate of discharge are discontinuous and unacceptable for use in continuous processes.

Since "on-off" bin level devices of these types are inappropriate for use in continuous processes, their use predominantly has been limited to alarm circuitry in which immediate process shut down or other emergency, corrective measures are indicated. In continuous processes involving a long time period of product storage or presence within a bin, it has long been the practice for the bin level and flow rate of discharge to or from the bin to be controlled by human operators. This expedient is definitely not economical at present. In addition, it reduces the likelihood of using a bin storage system with a process requiring a relatively high process flow rate for its implementation.

It is therefore an object of this invention to provide a variable setting pinch valve useful in bin level and flow rate control systems which provides linear, continuous control of the flow rate of a material therethrough.

SUMMARY OF THE INVENTION

Briefly, these and other objects are achieved in one embodiment of the invention by providing a pinch valve including a compressible tubing, a mechanism for compressing the tubing placed around the circumference thereof, and a transfer section having its outlet connected to the inlet of the tubing, which transfer section tapers from its inlet to its outlet in a manner approximating the free flow of material falling through the inlet of the transfer section, with the diameter of the transfer section's outlet being equal to the diameter of said tubing.

BRIEF DESCRIPTION OF THE DRAWINGS

The invention is particularly pointed out and distinctly claimed in the concluding portion of this specification. For a complete understanding thereof, together with further objects and advantages, reference should be made to the following portion of the specification taken in conjunction with the accompanying drawings in which:

DESCRIPTION OF A PREFERRED EMBODIMENT

Figure 1:
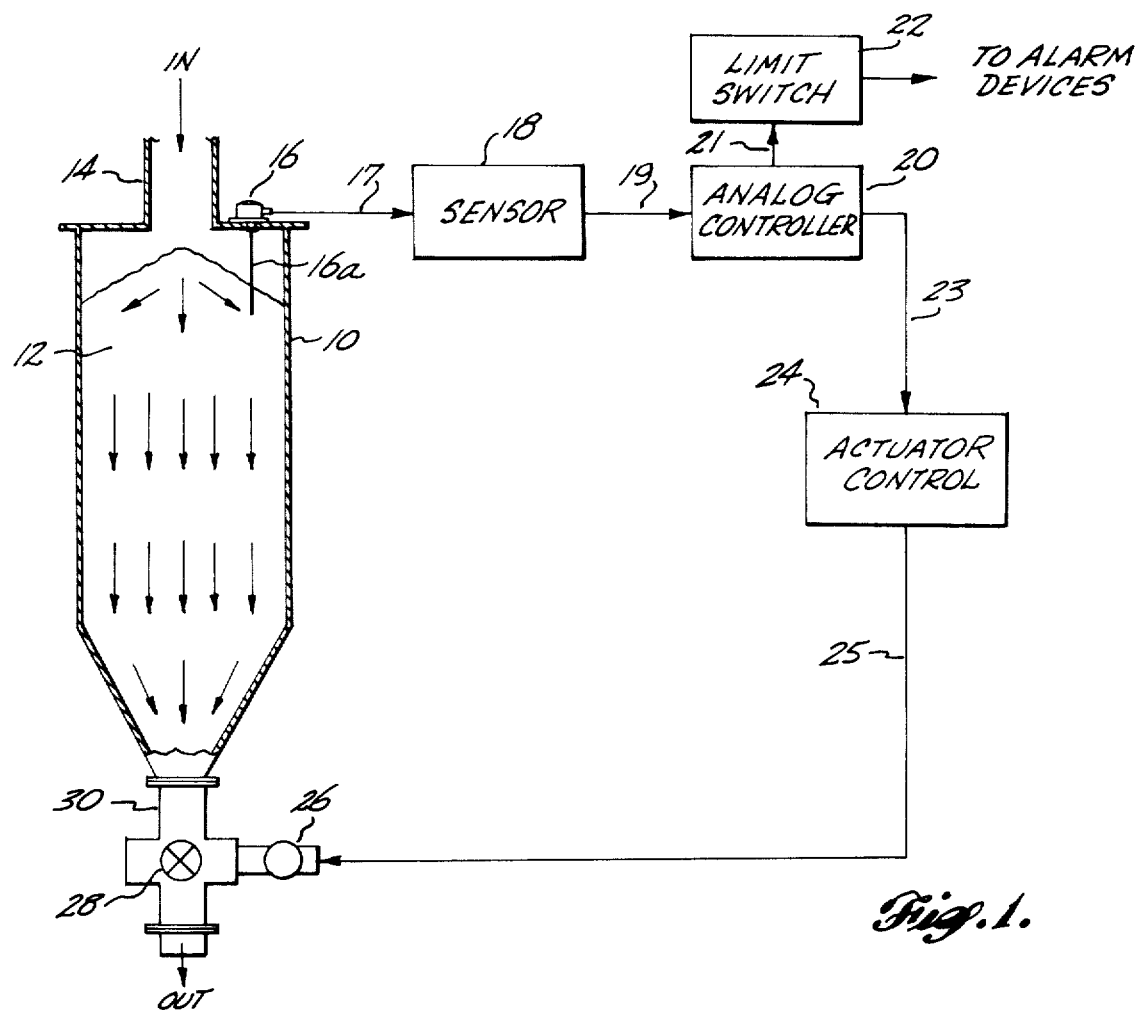
FIG. 1 is a block diagram of the system of this invention.

With particular reference to FIG. 1, a bin or tank 10 forms one link of an industrial process and provides a means for temporary storage of a product 12 therein. The product 12 may comprise particulate material, such as wheat and other grains, cement, powders, and the like, or a liquid, such as a solution or slurry of solid products, or a chemical constituent in the process. The product 12 is placed in the bin 10 through an entrance opening 14 which preferably is coupled to another device used in the process. The device may be a conveyor, a flow controlling valve, or the like, so that the product 12 is placed in the bin continuously, or at fairly regular intervals.

In industrial processes of the type under consideration, the product 12 is stored in the bin 10 for a relatively long period of time, that is, on the order of 10 to 30 minutes. For example, if the product comprises wheat, and the industrial process has as an end product thereof flour, the wheat may be taken from a first storage bin, passed through a moistening process wherein a continuous flow of water is added to the continuous flow of wheat, and then placed in a second storage bin, such as bin 10 of FIG. 1, for a prescribed length of time so that the wheat can absorb the surface water before it is passed on to the next step of the process.

In such a process the system to be described may be used for controlling the operation of both the first and second bins. In the first example, the wheat is added to the bin by dumping so that the wheat level therein varies in distinct, irregular steps. However, flow of wheat from the bin must be uniform and continuous, and therefore the control system must compensate for such irregular changes in bin level to provide a continuous and uniform flow rate of discharge therefrom.

The second bin may be filled continuously, but also must be emptied continuously if a truly continuous process is to be achieved. In this example also, the control system must assure a smooth and steady flow rate of discharge of the wheat to or from the bin to a device embodying the next process step.

To ensure such continuous operation, the system of this invention provides a first signal which is directly proportional to the level of the product 12 within bin 10, and operates on that first signal by suitable analog circuitry to obtain a second signal which represents a desired control actuation for a device regulating the flow rate of discharge to or from bin 10. In the case where the flow rate of discharge from the bin is to be controlled, the second signal embodies time constants which approximate the long time constants involved in the work function of the bin. The term "work function" describes the controlling parameter of the process, or flow rate, in terms of the measured parameter of the process, or bin level. This relation, as described in more detail hereinafter, includes the control function needed to control bin level and also includes any variations on or additions to that function which arise from the particular process being controlled. If the controlling flow rate is that of product discharge into the bin, the work function differs from that when the controlling flow rate is that of product discharge from the bin. For purposes of explanation only, the invention will hereinafter be described only with respect to controlling bin level by varying the bin discharge flow rate.

The term "time constant" describes the time required, given a particular work function, for changes in the controlling flow rate to be reflected in changes in the bin level.

More specifically, an electrode assembly 16 is disposed on bin 10 and includes an elongated metallic rod 16a which extends into the interior of bin 10. As will be seen hereinafter, electrode assembly 16 is insulated by suitable means from the metallic bin 10. In addition, rod 16a extends into bin 10 for a distance sufficient to insure contact thereof with the product 12 during anticipated normal conditions of operation.

An output signal obtained from electrode assembly 16 is therefore proportional to the impedance between rod 16a and the metallic bin 10, which is preferably maintained at ground potential. This signal is supplied via a line 17 to a sensor circuit 18 which converts this output signal into a signal on line 19 which is directly proportional to the level of the product 12 in bin 10. To this end, sensor 18 includes circuits controlling the measurement of the impedance between rod 16a and bin 10 and the corresponding production of an output signal from electrode assembly 16, and circuits linearizing this output signal so that a true proportional indication is obtained.

The proportional signal on line 19 is supplied to an analog controller 20 which functions to provide stable control of bin level at a continuous flow rate of discharge therefrom by including means approximating the work function and accompanying time constants of the bin 10 in the process step involved. To this end, analog controller 20 compares the proportional level signal on line 19 with a reference, if desired, and then converts any undesirable deviation from that reference into a suitable control signal supplied on a line 23 to an actuator control 24 for the control device of this invention. Analog controller 20 also supplies an output signal on line 21 to a limit switch circuit 22 which functions to detect undesirable extreme maximum and minimum bin levels. The signal on line 21 may be directly proportional to bin level, and thus correspond to the signal on line 19, or may be representative of the deviation of the bin level from a desired reference. In either case, limit switch circuit 22 supplies an output signal to an alarm device, not shown, when either the maximum or the minimum bin level condition occurs. The alarm device may comprise a warning mechanism, a shut down device for the input and output feeding mechanisms associated with bin 10, or the like.

The actuator control circuit 24 supplies an appropriate control signal on a line 25 to actuator 26. In turn, actuator 26 controls the position of a control device 28 which is disposed in an exit 30 from bin 10. As will be explained in more detail hereinafter, flow control device 28 is preferably of the pinch valve type in which means are provided to vary the cross-sectional area of a collapsible tube, and accordingly actuator 26 converts the signal from actuator control 24 into an appropriate mechanical movement for the area or flow controlling means of device 28. The circuitry within actuator control 24 must be chosen to accommodate the time constants and operational requirements of both the actuator 26 and the flow control device 28. The actuator control 24 and actuator 26 preferably comprise an electric drive system which is designed to provide a slowly changing mechanical movement at the output of actuator 26 in response to the slowly changing control signal from analog controller 20. Alternatively, actuator 26 could comprise a motor drive for a variable speed conveying mechanism whose speed is varied in proportion to the control signal from analog controller 20, a hydraulic valve actuator, or the like.

A detailed discussion of analog controller 20 and actuator control 24 can be found in the aforementioned co-pending patent application. It is to be clearly understood that this invention in its broadest aspect is not directed towards those components only, but rather to those components in combination with the sensor 18, electrode assembly 16, and actuator 26.

Figure 2:
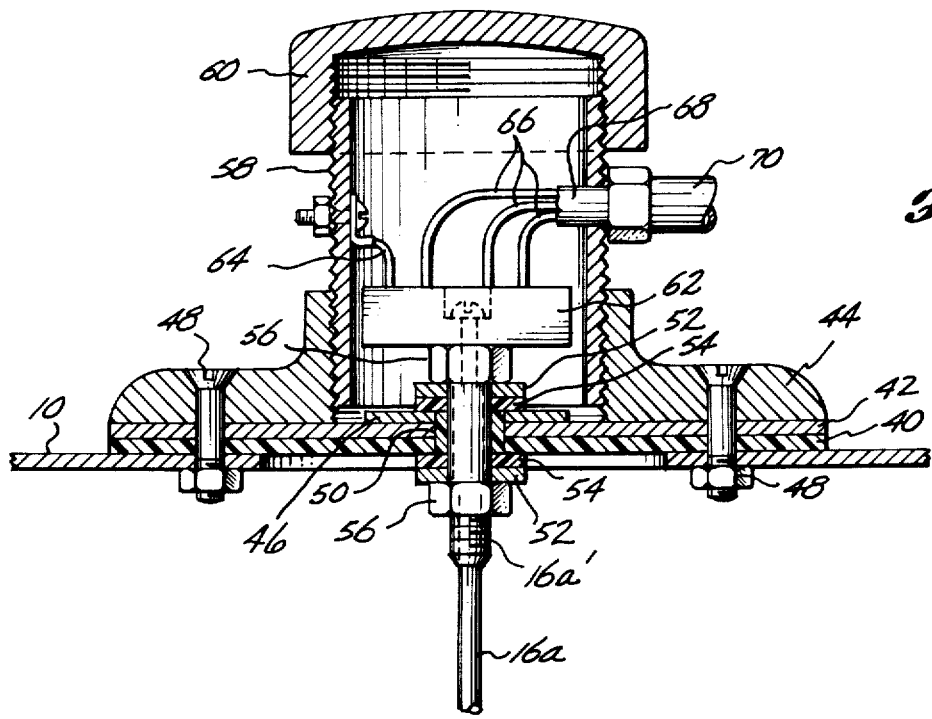
FIG. 2 is a cut-away pictorial view of a portion of the bin level sensor illustrated in FIG. 1.

The invention can perhaps best be understood by reference to specific embodiments of the system elements. With reference now to the electrode assembly construction of FIG. 2, the metallic rod 16a includes an enlarged, threaded portion 16a' which is affixed to the electrode assembly 16. Specifically, an aperture is cut in the top of bin 10 and the electrode assembly 16 and rod 16a are inserted therein. An insulating plate 40 covers the aperture in the top of bin 10 and preferably comprises Teflon or other plastic material which inhibits the formation of deposits of the product 12 upon its surface. A stainless steel plate 42 is coextensive with insulating plate 40 and supports a housing 44 and an electrode support plate 46 on its upper surface. The combination of plates 40 and 42 and housing 44 is secured to the bin 10 by a plurality of suitable fastening means 48 which additionally serve to electrically connect housing 44 to bin 10 so that both are at the same electrical potential.

A central aperture is provided in plates 40, 42 and 46 to permit passage of the portion 16a' of rod 16a therethrough. An insulating spacer 50 surrounds portion 16a' throughout the extent of the aperture in plates 40, 42 and 46. In addition, portion 16a' is secured to this plate assembly by inner insulating washers 54 outer stainless steel washers 54, and nuts 56 which are threaded onto portions 16a' to compress the washer and plate assembly. As with plate 40, spacer 50 and washers 54 are preferably of Teflon so that the interior of housing 44 is sealed from the interior of bin 10. In the cooking of bulgur wheat, for example, the wheat within bin 10 is hot and moist so that residues tend to form on the inner surfaces of the bin. Without the use of a sealing and insulating material such as Teflon, these residues would in time coat both the aperture in bin 10 through which the electrode assembly 16 protrudes and the sensitive electronic components hereinafter to be described within the interior of housing 44.

If desired, housing 44 may be secured to steel plate 42 by an epoxy cement or the like to further increase the rigidity of the electrode assembly 16.

A threaded portion 58 and a cap portion 60 complete the housing for the electrode assembly 16 and, together with housing portion 44, define a chamber in which some or all of the circuitry within sensor 18 is disposed.

Figure 3A:
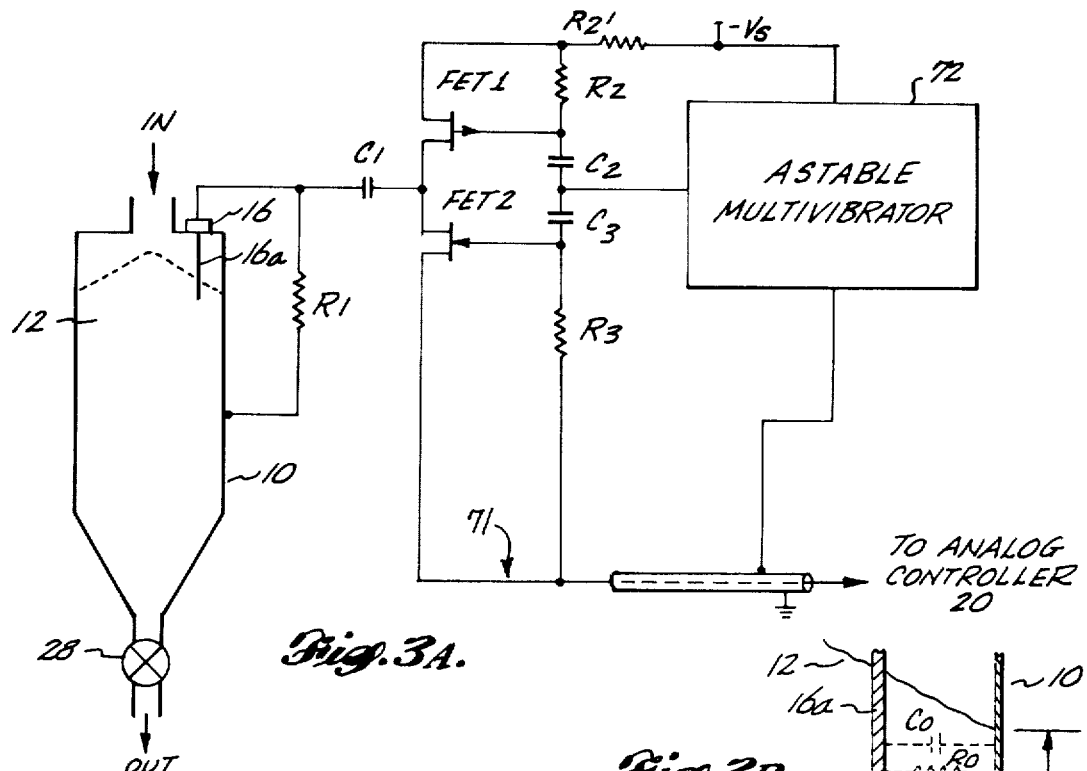
FIG. 3A is a schematic diagram showing the electrical components of the sensor of FIG. 1.

Specifically, a circuit board 62 is secured to the top of rod 16a by a suitable fastening means and has disposed thereon a plurality of electronic components, preferably configured as illustrated in the schematic diagram of FIG. 3A. The circuit board 62 may be potted in a suitable moisture-proof compound and a plurality of leads provided therefrom for appropriate connection to the remainder of the system. A lead 64 is attached directly to housing portion 58 which is, as previously discussed, at ground potential, and a plurality of leads 66 are passed through a suitable fitting 68 into a conduit 70 for connection to analog controller 20.

Experiments with electrodes of this type indicate that in spite of a hot, humid, dirty and corrosive environment within the interior of bin 10, a relatively high leakage impedance, on the order of 20 megohms, can be maintained between rod 16a and the surrounding portions of bin 10. In those experiments, the rod 16a comprised a 4 feet long, quarter-inch diameter, stainless steel bar. As the sensor circuits hereinafter to be described measure the level of the product 12 in bin 10 by determining the complex impedance between rod 16a and bin 10, a simple metallic rod can be used for relatively or moderate dry particulate material. However, if the product 12 is very moist or a liquid, in which case the resistance between rod 16a to bin 10 is very low, it is desirable to measure only the distributed capacitance therebetween and in such cases the stainless steel rod 16a may be covered with a plastic insulating tube, such as Teflon.

Figure 3B:
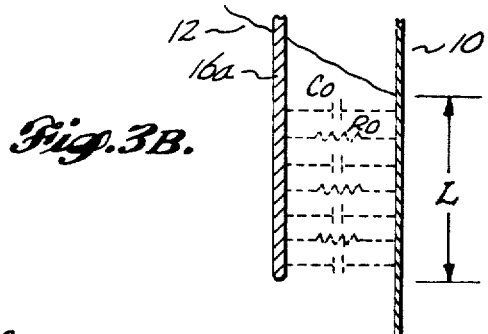
FIG. 3B is a pictorial view illustrating the operation of the sensor.

Referring now to FIGS. 3A and 3B, the sensor 18 provides an output signal which is proportional to bin level by measuring the complex impedance between the electrode rod 16a and the adjacent bin 10. With particular reference to FIG. 3B, this impedance may be visualized as comprising a plurality of distributed capacitances $C_o$ and a plurality of distributed resistances $R_o$. When the rod 16a is immersed in the product 12, the total resistance between rod 16a and bin 10 can be expressed as $R_r = R_o/L$ where $R_o$ is the resistance per unit length of rod and L is the length of rod that is immersed in the product. As seen in FIG. 3B, the resistance $R_r$ results from the plurality of resistances $R_o$ which are effectively connected in parallel. It has been found that for moist wheat, the resistance $R_r$ for a length of immersion L equal to one inch is about 10 kilohms. Twelve inches of immersion produces an $R_r$ equal to 840 ohms.

The complex impedance resulting from the plurality of capacitances $C_o$ also decreases with increasing product level and increase in length of immersion L. The total capacitance between rod 16a and bin 10 may be expressed as $C_r = C_o \cdot L$, where $C_o$ is the capacitance per unit length of the rod and L is again the length of the rod immersed in the product. It has been found that for moist wheat the capacitance $C_r$ varies from 20 picofarads for L equal to zero to 70 picofarads for L equal to 3 feet.

In FIG. 3A, the electrode rod 16a is coupled to the common junction of a capacitor C1 and a resistor R1. Resistor R1 is connected in parallel with the impedance between rod 16a and bin 10 and capacitor C1 is in turn connected to the common junction of two field effect transistors FET1 and FET2. Each of these devices, as it is well known, has a gate electrode, a drain electrode, and a source electrode. In the embodiment illustrated, the source electrode of FET1 is connected to the drain electrode of FET2. The drain electrode of FET1 is connected to a negative voltage supply $-V_x$ and the source electrode of FET2 is connected to an output lead 71.

When a field effect transistor is in a non-conducting state, the input impedance between its drain and source electrodes is very high, on the order of hundreds of megohms. Thus, the field effect transistor is desirable for the measurement of small complex impedances.

FET1 and FET2 are alternately switched at a desired frequency $f$ by an astable multivibrator 72 which is connected to $-V_x$ and to ground potential and which provides a relatively square wave output signal which is coupled to the gate electrodes of FET1 and FET2 through an input network comprising capacitors C2 and C3, respectively. A resistor R2 is connected between the gate to the drain electrodes of FET1 and a resistor R3 is connected between the gate to the source electrodes of FET2. A resistor R2' connects the supply $-V_x$ to R2. Finally, the lead 71 is connected to the central conductor of a coaxial cable 73 and the shield thereof is connected to ground potential.

In operation, a stable multivibrator 72 first energizes FET1 to apply a given voltage across the series connection of capacitor C1 and the capacitance $C_x$ between rod 16a and bin 10. Accordingly, the series capacitance is charged to a given value. Then, FET2 is energized by astable multivibrator 72 to provide a discharge path to line 71. If the capacitance of C1 is much larger than the anticipated capacitance $C_x$, so that the complex impedance thereof is much smaller, the discharge current appearing on line 71 is inversely proportional to the change in complex impedance and thus directly proportional to the change in depth of submersion L.

Resistor R1 should be chosen to have a relatively large value so as to not affect the measurement of impedance while preventing the buildup of static charges on the electrode rod 16a and the bin 10. In order to obtain adequate current levels from the small capacitances involved, the switching frequency $f$ of astable multivibrator 72 should be relatively high. For a capacitance $C_x$ of approximately 100 pf, maximum, a frequency $f$ of 1 MHz produces an output current in the range of 0.5 to 2.0 ma. The multivibrator 72 may be any conventional type which can provide a relatively square wave signal having a frequency of this magnitude.

A working model of the electrode assembly 16 and sensor 18 was constructed in which the component types and values were as in Table I.

TABLE I

| Component | Type and Value |
|---|---|
| R1 | 1 M |
| R2 | 10 M |
| R2' | 1 KΩ |
| R3 | 10 M |
| C1 | 1000 pf, 1KV |
| C2 | 1000 pf, 1KV |
| C3 | 1000 pf, 1KV |
| FET1 | 2N5462 |
| FET2 | 2N5485 |
| $-V_x$ | $-10$ v |

Figure 4:
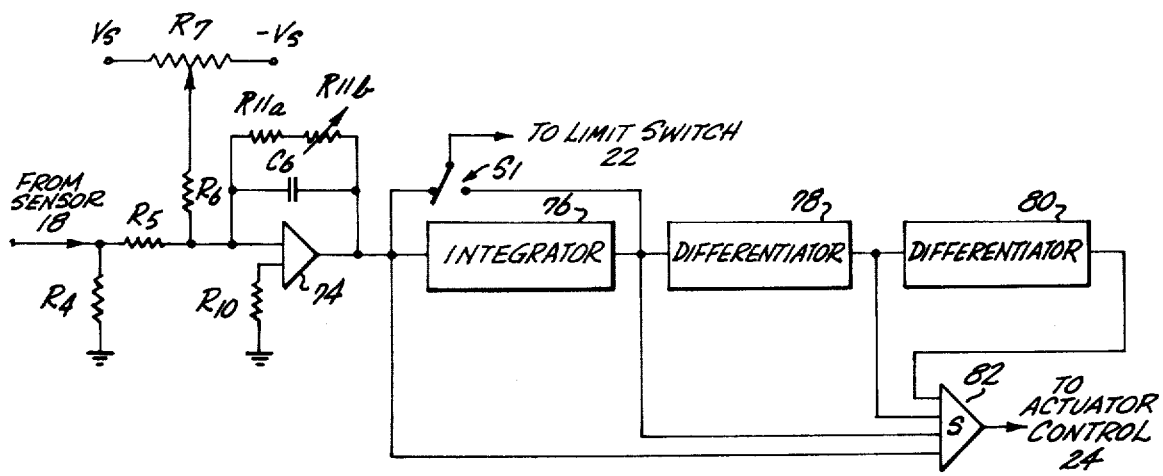
FIG. 4 is a schematic diagram of the analog controller of FIG. 1.

The signal thus appearing on the central conductor of the coaxial cable represents the aforementioned first signal or output from sensor 18 and is proportional to bin level. This first signal is supplied to analog controller 20. In the embodiment of FIG. 3A, the output from sensor 18 has a negative polarity and is used to develop a corresponding negative voltage across input resistance R4 in FIG. 4. R4 forms one portion of a voltage divider further comprising a limiting resistor R5 connected to the inverting input of an operational amplifier 74 and a resistor R6 connected from that inverting input to potentiometer R7 connected between $\pm V_x$. Operational amplifier 74 is referenced to ground potential through a resistor R10 and a feedback loop is provided therearound which includes series-connected resistors R11a and R11b and capacitor C6 in parallel.

The function of the input network including resistors R4-R7 is to adjust the level of the signal from sensor 18 so that the output signal from amplifier 74 is at about ground potential when the bin level is at a desired value. Of course, this is merely one embodiment of such a normalizing circuit, which provides for anticipated variations in bin level above and below the desired value. In certain cases, it may be anticipated that the bin level will only increase, or will only decrease, and thus a normalizing circuit of the type illustrated in FIG. 4 can be dispensed with.

The feedback loop including capacitor C6 and resistors R11a and R11b, in combination with amplifier 74, functions to filter out noise from the signal from sensor 18 so that a truly linear, proportional output signal is obtained from amplifier 74. As discussed, this signal has a value equal to ground potential at the desired bin level, and has positive and negative polarities corresponding to high and low bin levels, respectively.

The signal is applied to a stationary terminal of a switch S1, to the input of an integrator 76, and to one input of a summing amplifier 82. The output of integrator 76 is connected to a second input of summing amplifier 82 and to the input of a differentiator 78. Likewise, the output of differentiator 78 is connected to a third input of summing amplifier 82 and to the input of a second differentiator 80 whose output is connected to a fourth input of summing amplifier 82. The output of summing amplifier 82 is in turn connected to the actuator control 24.

The functions of integrator 76, differentiators 78 and 80, and summing amplifier 82 are described in more detail in the aforementioned co-pending application and reference should be made thereto for full details and disclosure of the elements thereof. In summary, these elements provide sensitive and stable operation of the system by providing a second or control signal from the first signal supplied to analog controller 20 which is representative of the particular work function between the controlling flow rate and the bin level.

The work function of the bin includes a relatively slow time for changes in the controlling flow rate of discharge therefrom to be reflected in desired changes in bin level, on the order of 10 to 30 minutes. However, the bin level itself may vary at a somewhat faster rate. When wheat or other particulate material is dumped in the bin 10, it shifts position at a fairly high rate so that false indications of bin level are received. In addition, as wheat is slowly discharged from the bin 10, another, slower shifting of the grain at the top of the bin occurs, which again is not a true indication of a change in bin level.

If these relatively fast changes in bin level were allowed to remain, the control system would be continuously driven between maximum and minimum values and the true work function of the bin would be obscured. Therefore, integrator 76 is chosen to have a time constant approximating that of the short-term variations in bin level that do not correspond to the bin work function. Generally, these variations are on the order of one to two minutes. The output signal from integrator 76 thus corresponds to the normalized bin level signal, with the short-term variations filtered therefrom.

The differentiator 78 takes the first derivative of the output signal from integrator 76 while operating with a time constant which approximates the true work function of the bin. For most industrial processes under consideration, this time constant is on the order of 15 to 30 minutes. It should be noted that the time constant of integrator 76 must be long enough to filter out the short-term variations in bin level that do not correspond to the work function of the bin, yet short enough so that there is no compensation for the action of differentiator 78.

In effect, differentiator 78 limits the rate of change of the control signal supplied to actuator control 24. In this manner, a truly continuous flow of the product 12 from the bin 10 can be obtained, while the bin level itself is maintained constant.

Due to the positive feedback that must be used in any integrating scheme, an element of instability is added to the control system by integrator 76. This element of instability is removed by taking the second derivative of the normalized bin level signal, by means of differentiator 80, to damp any oscillations resulting from such instability.

The outputs from operational amplifier 74, integrator 76, and differentiators 78 and 80 are summed in summing amplifier 82 as heretofore described to form the desired second signal which is applied to actuator control 24. This second signal may be expressed as $V = K_1 E + K_2 \int^T E dt + K_3 \dot{E} + K_4 \ddot{E}$ where: $V$ = the magnitude of the second signal, $E$ = the magnitude of the bin level signal present at the input of amplifier 74; $K_1$, $K_2$, $K_3$ and $K_4$ = the gain constants of amplifier 74, integrator 76, and differentiators 78 and 80, respectively; $\dot{E}$ = the magnitude of the first derivative output signal from differentiator 78, $\ddot{E}$ = the magnitude of the second derivative output signal from differentiator 80, and $T$ = the time constant of integrator 76.

In this relation, the quantity on the right-hand side mathematically approximates the work function of the bin, and the time constants of the derivatives are the time constant of that work function.

A working model was constructed and included the component types and values listed in Table II.

TABLE II

| Component | Type and Value |
|---|---|
| R4 | 1 KΩ |
| R5 | 68 KΩ |
| R6 | 47 KΩ |
| R7 | 10 KΩ |
| R10 | 0 or 50 KΩ |
| R11a | 10 KΩ |
| R11b | 1 M |
| C6 | .01 µf |
| 74 | RCA CA 3033 or CA 3047 |
| $V_s$ | 10 v |

In proportion to the magnitude and sense of the second or control signal, actuator control 24 varies the speed and direction of rotation of the actuator 26. Desired embodiments of the actuator control 24 and actuator 26 are described in detail in the aforementioned co-pending application. It will be briefly noted that the actuator 26 may utilize a DC motor, an AC stepping motor, an AC synchronous motor, a hydraulic actuator, or the like, and that the control circuitry within actuator control 24 is appropriately modified to fit each type of motor. In all cases, a mechanical movement is provided by actuator 26 whose speed and direction of rotation is directly proportional to the magnitude and sense of the second signal supplied to actuator control 24.

In emergency situations, it is desirable to either sound an alarm or shutdown adjoining apparatus used in the industrial process. Emergency situations of this type may be encountered when the level of product 12 within bin 10 exceeds a predetermined range. To sense this condition both the input and output signals associated with integrator 76 are applied to opposite terminals of the switch S1 whose movable contact is connected directly to limit switch circuit 22. If the movable arm of S1 connects the output signal from operational amplifier 74 to limit switch 22, an alarm indication is provided whenever bin level varies from this predetermined range. If the movable arm of switch S1 connects the output signal from integrator 76 to limit switch circuit 22, an alarm is provided only if such a departure from the predetermined range persists for a period of time longer than the time constant of integrator 76.

Figure 5:
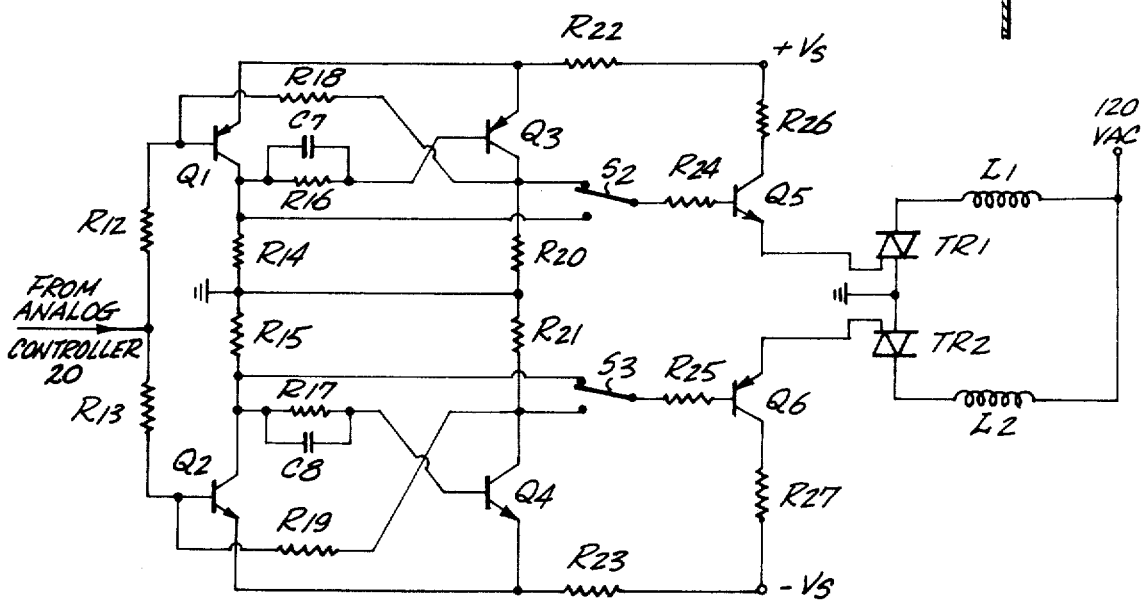
FIG. 5 is a schematic diagram of the limit switch circuit of FIG. 1.

In FIG. 5, one of these output signals from analog controller 20 is applied to two symmetrical circuits, each comprising a threshold-sensing switch, an amplifier, and a controllable bi-directional semiconductor switch in series with a corresponding relay coil whose energization or de-energization provides a desired output indication.

One of these circuits responds to positive levels of the input signal. In this positive polarity circuit, transistors Q1 and Q3 form the threshold sensing switch, transistor Q5 the amplifier, Triac TR1 the controllable bi-directional semiconductor switch and L1 the relay coil which is connected between an AC source and ground potential. In the corresponding negative polarity circuit, transistors Q2 and Q4 form the threshold sensing switch, transistor Q6 the amplifier, Triac TR2 the controllable bi-directional semiconductor switch, and L2 the relay coil which is also connected between the AC source and ground potential. Since the positive and negative polarity circuits are identical, only the operation of the former will be described in detail.

The positive polarity circuit is designed to provide an output signal when the signal from analog controller 20 exceeds a certain fraction of the supply $V_s$ such as 0.75 $V_s$. In this operation, it is essential that the Triac TR1 be turned on instantly under limit conditions for both half cycles of the AC waveform thereacross. The Triac TR1 remains turned on for as long as the input signal exceeds 0.75 $V_s$, for example, and is turned off when the input signal decreases to a value approximately 10 percent less than 0.75 $V_s$. The normal range of this output is ±0.9 $V_s$, for example.

When the signal from analog controller 20 is less than 0.75 $V_s$, transistor Q1 is normally conducting. The resultant current therethrough produces a voltage drop across resistor R22 which accordingly reduces the voltage at the emitter of Q1 to approximately 0.75 $V_s$. Transistor Q3 is normally non-conducting by virtue of the connection from R16. Q1 is maintained in a conducting state by bias circuits from input resistors R12 and R18 in the cross-coupling path between the collector of Q3 which is at ground potential, and the base of Q1.

If the signal from analog controller 20 increases so that the voltage appearing across input resistor R12 is approximately 0.7 $V_x$, bias current is no longer supplied by R12, but transistor Q1 is maintained in a conducting state by bias current from R18 if the $\beta$ of Q1 is sufficiently large, say greater than 100. When the input voltage rises above 0.75 $V_x$, Q1 begins to turn off and the voltage at the collector thereof is sharply reduced to approximately ground potential. The resultant voltage pulse across capacitor C7 connected thereto begins to turn on transistor Q3 at a rate determined by the time constant of the C7-R16 parallel combination in the cross-coupling path between transistors Q1 and Q3. As transistor Q3 turns on, the current flow therethrough produces an increase in voltage across collector resistor R20 therefor to 0.7 $V_x$. Since the collector of transistor Q3 and the base of transistor Q1 are now at about the same potential, current flow through cross-coupled resistor R18 becomes zero so that transistor Q1 is latched in a non-conducting condition.

The voltage across resistor R20 of 0.7 $V_x$ is coupled through a switch S2 and a resistor R24 to the base of amplifying transistor Q5 and thence to the gate electrode of Triac TR1. Transistor Q5 insures that sufficient gate current is presented to the gate electrode of Triac TR1 to insure its conduction throughout the entirety of both half cycles of the AC waveform thereacross, for such Triacs require different levels of gate current for each direction of current therethrough.

When Triac TR1 is triggered, a current path exists therethrough to energize the corresponding relay coil L1. This coil remains energized until the signal from analog controller 20 drops to a value about 10 percent lower than the threshold value 0.75 $V_x$ and transistor Q1 is again latched in a conducting state.

If desired, the circuit may be set by operating switch S2 to its alternate position so that Triac TR1 is energized whenever the signal from analog controller 20 is below the threshold value. In this case, the gate current for Triac TR1 is obtained from the collector of transistor Q1 through switch S2, resistor R24, and transistor Q5, and Triac TR1 is placed in a non-conducting condition when the input signal level exceeds 0.75 $V_x$ as previously described.

The negative polarity circuit works in an identical manner to provide energization or de-energization of relay coil L2 when the signal from analog controller 20 exceeds a certain fraction of the negative supply voltage $-V_x$.

Accordingly, the relay energizations can be used as "high" and "low" bin level limit indications. A working model of the circuit in FIG. 5 was constructed and included the component types and values listed in Table III.

TABLE III

| Component | Type and Value |
| --- | --- |
| R12 | 100 KΩ |
| R13 | 100 KΩ |
| R14 | 6.2 KΩ |
| R15 | 6.2 KΩ |
| R16 | 0.5 M |

TABLE III-Continued

| Component | Type and Value |
| --- | --- |
| R17 | 0.5 M |
| R18 | 0.5 M |
| R19 | 0.5 M |
| R20 | 6.8 KΩ |
| R21 | 6.8 KΩ |
| R22 | 3.3 KΩ |
| R23 | 3.3 KΩ |
| R24 | 100 KΩ |
| R25 | 100 KΩ |
| R26 | 1 KΩ |
| R27 | 1 KΩ |
| C7 | 1 μf |
| C8 | 1 μf |
| Q1 | 2N3906 |
| Q2 | 2N3904 |
| Q3 | 2N3906 |
| Q4 | 2N3904 |
| Q5 | 2N3904 |
| Q6 | 2N3906 |
| TR1 | 40526 (RCA) |
| TR2 | 40526 (RCA) |

The flow control device 28 must be of a type so as to provide a linear relationship between the flow rate achieved therethrough and the output of actuator 26. If the flow control device 28 comprises a conveying means, for example, it is usually easy enough to provide such a linear relationship by simply controlling the speed of the conveying means in response to the degree and sense of the output signal from actuator control 24.

For bin level control, however, the flow control device 28 most often comprises a valve whose cross-sectional area is varied in response to the degree and direction of a mechanical movement obtained from actuator 26. For particulate materials such as grain, a preferred embodiment of such a valve would be the well-known pinch valve which comprises a length of flexible tubing attached to the bottom of bin 10 whose cross-sectional area is varied by a compressive, radial movement of two or more pinch bars. Perhaps the most common of these is the two bar pinch valve in which the tubing is compressed at two diametrically opposite points. Such a valve does not provide a linear relationship between tubing cross-sectional area and radial movement of the pinch bars. The tubing is first deformed into an elliptical shape in which the effective cross-sectional area remains the same. Only after the pinch bars have moved through half of their total radial movement does the cross-sectional area of the tubing decrease, and then in a non-linear manner.

In comparison, three and four bar pinch valves using compression at three and four points equi-distantly spaced around the circumference of the tubing provide a relatively linear relationship between tubing cross-sectional area and radial movement of the pinch bars.

However, it has been found that this relatively linear relationship exists only for large deformations of the tubing. For small deformations, the relationship becomes non-linear and includes an abrupt change in flow rate at a particular value of deformation.

Figure 6:
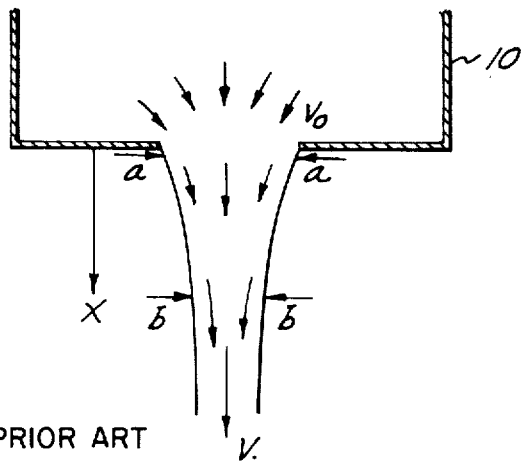
FIG. 6 is a view illustrating the flow properties of a freely flowing product through an orifice.
Figure 7:
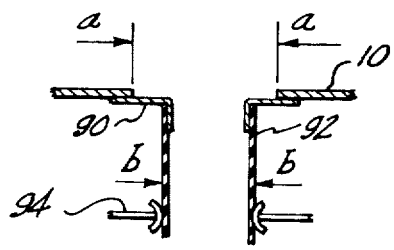
FIG. 7 is a view illustrating the effects of a constriction on such a flow pattern.
Figure 10:
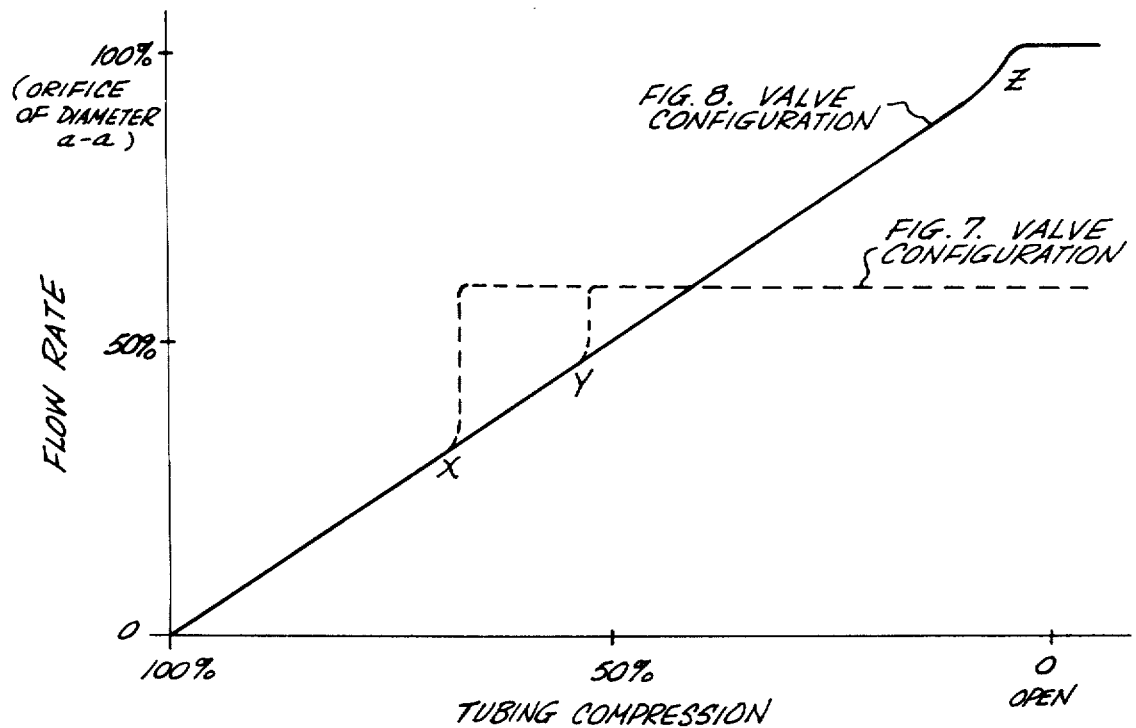
FIG. 10 is a graph illustrating the relative linearity of flow of the constriction in FIG. 7 and the valve arrangement in FIG. 8.

The reason for this non-linear relationship at small amounts of tubing deformation can perhaps best be understood by considering the diagrams in FIGS. 6, 7 and 10. In FIG. 6, particulate material is discharged through an orifice of diameter $a-a$ in the bottom of bin 10, for example. The flow rate of discharge is determined by the cross-sectional area at the diameter $a-a$ and by the velocity $v_o$ of the particulate material through the plane of the orifice. Below the orifice plane, the particulate material accelerates due to the action of gravity, as shown in FIG. 6 by the velocity vector $v$, where $v(x) = (2gx + v_o^2)^{1/2}$, wherein $x$ equals the distance of the material below the orifice plane, and $g$ equals the acceleration due to gravity. Because of this acceleration of a free-falling particulate material, the column's diameter, assuming a constant density thereof, is gradually reduced and assumes, at a certain distance $x_1$ from the orifice plane, a diameter of $b-b$.

A piece of rubber or other compressible tubing having the same diameter $a-a$ as the orifice may now be attached to the bottom of the bin 10, wherein the pinch bars therefor lie in a plane at or below the plane including diameter $b-b$. Since the tubing is not completely filled by the free-falling material, the pinching action is not effective until the cross-sectional diameter in the plane of pinch operation is equal to or smaller than the diameter $b-b$. With such an arrangement, there is a dead zone resulting in the aforementioned abrupt change in flow rate.

An experiment was made with particulate material and an orifice of diameter $a-a$ in which a compressible tube 92 of diameter $b-b$ was affixed to the bottom of bin 10 adjacent the orifice by a circular flange 90, as best illustrated in FIG. 7. Pinching action was applied in a plane a certain distance below the orifice plane by three pinch bars 94 which were equi-distantly spaced around the circumference of tubing 92. With this device, the maximum flow rate, which would be a maximum at the orifice of diameter $a-a$, is reduced from that value by virtue of the smaller cross-sectional area of tubing 92.

With particular reference to FIG. 10, the dotted curve illustrates the maximum flow rate obtained with the configuration of FIG. 7, which is about 60 percent of that obtained with an orifice of diameter $a-a$. This flow rate remained constant with decreases is cross-sectional area of the tubing 92 until the cross-sectional area thereof was reduced to a value of less than 50 percent of the fully opened value. At that point, the flow rate abruptly decreased to a value less than 50 percent of maximum, as indicated at point $x$, and thereafter was controlled linearly down to zero with further decreases in the tube cross-sectional area.

Further experiments with the apparatus of FIG. 7 illustrated that as the diameter of the tubing 92 was increased to approximately $a-a$, the abrupt change in flow rate occurred at larger values thereof. In addition, the region of linear response was increased from $x$ to $y$, for example.

Figure 8:
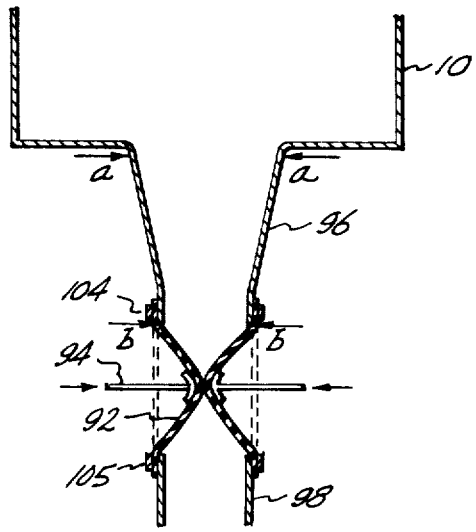
FIGS. 8 and 9 are section and top pictorial views, respectively, of the valve of FIG. 1.

In view of this behavior, the apparatus of FIG. 8 was devised. Affixed to the bottom of bin 10 adjacent orifice $a-a$ is a conical transfer section 96 which tapers from a diameter $a-a$ at its upper end to a diameter $b-b$ at its lower end. The length of the transfer piece 96 is equal to the dimension $x_1$ at which the diameter $b-b$ of the freely falling material occurs. The rubber tubing 92 is affixed to the bottom end of transfer section 96 and has throughout a diameter $b-b$. Attached to the bottom of rubber tubing 92 is an exit piece 98. To achieve a truly linear relationship, the plane of pinching by the three pinching bars 94 must be as close as possible to the lower end of conical transfer section 96.

With this arrangement, a relationship such as illustrated by the solid line in FIG. 10 has been achieved. It should be noticed that the abrupt change in flow rate occurs only at a very small value of tubing compression so that flow rate control is linear from zero to almost 100 percent. In addition, the maximum flow rate through the pinch valve is now approximately equal to the maximum flow rate determined by the diameter $a-a$ of the orifice.

These results are apparently due to the conical transfer section 96 which approximates the flow of freely falling particulate material, of constant density, from orifice $a-a$ so that the entire cross-sectional area of the pinch valve at the lower end of the transfer section 96 and at the upper end of the tubing 92 is filled with the material.

Figure 9:
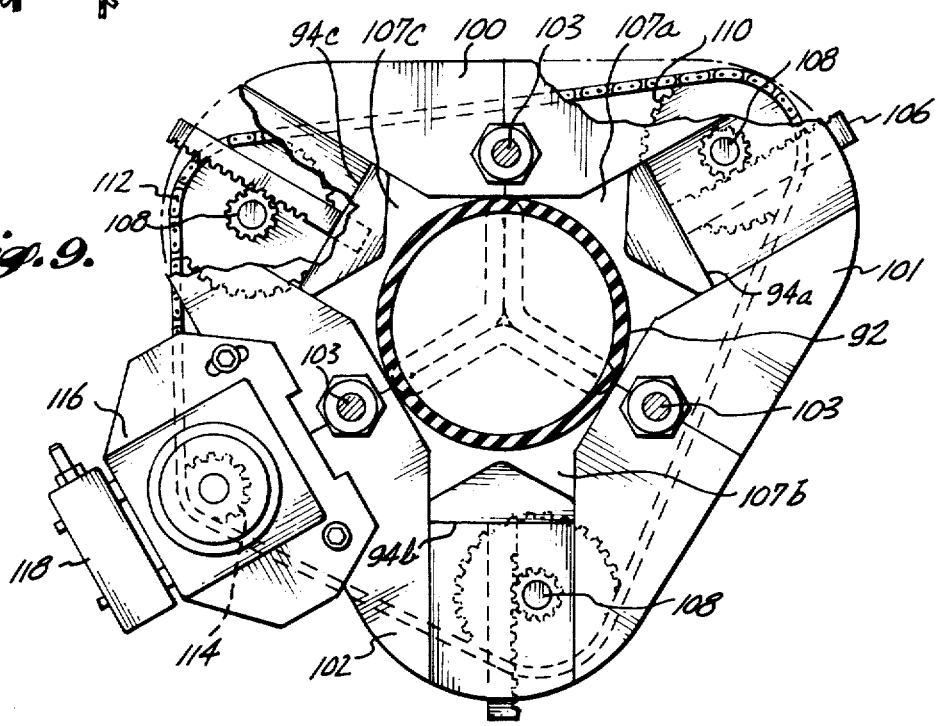

A practical embodiment of the pinching mechanism for the three bar pinch valve is seen in FIG. 9. Compressible tubing 92, which may comprise neoprene, is surrounded by three casting portions 100, 101 and 102 which are identical and which interlock in assembly to form a unitary flange about the tubing 92. Castings 100–102 are maintained in assembly by three fastening means 103 which additionally secure flanges 104 and 105, best shown in FIG. 8, to which the ends of the tubing 92 are secured.

Tubing 92 is compressed by the radial, reciprocative movement of pinch bars 94a, 94b, and 94c which provide compression of the tubing 92 in three radial directions spaced 120° apart. Pinch bars 94a, 94b, and 94c reciprocate in three channels 107a, 107b, and 107c formed in the castings 101, 102, and 100, respectively. The pinch bars 94a–94c are actuated by a rack and pinion gearing arrangement which is in turn actuated by the mechanical movement of electrical actuator 26.

In detail, each pinch bar is attached to a rack 106 which interacts with a pinion gear 108. Each of the pinion gears 108 is disposed on a common shaft with a second pinion 110 and rotatably journaled in the corresponding casting portion. A common chain 112 engages each of the second pinion gears 110 and in turn is rotated by a gear 114 which is affixed to the shaft of an electrical motor 116. Connection to electrical motor 116 is made through a junction box 118 and elements 114, 116, and 118 form the electrical actuator 26 of FIG. 1.

In operation, the mechanical movement of gear 114 is transmitted by the chain 112, gears 110 and 108 and racks 106 to result in a proportional movement of pinch bars 94a, 94b, and 94c. If the conical transfer section 96 of FIG. 8 is used in conjunction with the arrangement of FIG. 9, the flow rate of material discharge through the pinch valve and rubber tubing 92 also varies linearly with the radial movement of the three pinch bars 94a, 94b, and 94c so that the flow rate is thus linearly related to the mechanical movement of the electrical actuator.

While this invention has been described in terms of preferred embodiments of the electrode 16 and sensor 18, the limit switch 22 and the flow rate regulating device 28, it is to be clearly understood by those skilled in the art that the invention in its broadest aspects is not limited thereto, but rather is intended to be bounded by the limits of the appended claims.

What is claimed is:

1. A variable-setting pinch valve for use in providing proportional, linear control, in response to an input signal, of the flow rate of material being discharged due to gravity through an orifice of a container, the material being discharged having a convergence when unobstructed in its cross-sectional area in the direction of flow from that of the orifice to a lesser, substantially constant value, comprising:
- a. a compressible, rubber-like tubing having an inlet and an outlet, said tubing having a cross-sectional area substantially equal to said lesser value,
- b. means compressing said tubing at three points equi-distantly spaced around the circumference thereof in proportional response to the input signal,
- c. a transfer section means for directing material from the orifice to the inlet of said tubing, said transfer section means having an inlet and an outlet, the cross-sectional area of said transfer section means inlet being substantially equal to that of the orifice, the cross-sectional area of said transfer section means outlet being substantially equal to that of said tubing, and the cross-sectional area of said transfer section means intermediate said inlet and outlet having a convergence similar to the unobstructed convergence of the material, and
- d. means connecting said transfer section means outlet to the inlet of said tubing.

2. A variable-setting pinch valve as recited in claim 1, wherein said transfer section means has a substantially circular cross-sectional area at any point along its length.

3. A variable-setting pinch valve as recited in claim 1, wherein said tubing is composed of rubber.

4. A variable-setting pinch valve as recited in claim 3, wherein said rubber is neoprene.

5. A variable-setting pinch valve as recited in claim 1, wherein said means for compressing said tubing comprises:
- a. a casting surrounding said compressible tubing and defining three radial, equi-distantly spaced channels,
- b. means securing the inlet and outlet of said compressible tubing to said casting,
- c. first, second and third pinch bars mounted for reciprocative movement in said channels,
- d. a motor actuator having a shaft which is rotatable in proportional response to the input signal, and
- e. flexible drive means coupling said motor actuator shaft to each of said pinch bars.

* * * * *